United States Patent [19]
Yaniger et al.

[11] Patent Number: 6,084,572
[45] Date of Patent: Jul. 4, 2000

[54] ISOMETRIC POINTING DEVICE WITH INTEGRATED CLICK AND METHOD THEREFOR

[75] Inventors: Stuart I. Yaniger; Stewart M. Findlater, both of Ventura, Calif.

[73] Assignee: Interlink Electronics, Inc., Camarillo, Calif.

[21] Appl. No.: 08/853,653

[22] Filed: May 9, 1997

Related U.S. Application Data

[63] Continuation-in-part of application No. 08/320,008, Oct. 7, 1994, abandoned.

[51] Int. Cl.[7] .................................................. G09G 5/08

[52] U.S. Cl. .................... 345/159; 345/161; 345/162; 345/156

[58] Field of Search ...................... 345/159, 161, 345/156, 162, 168, 160; 341/20

[56] References Cited

U.S. PATENT DOCUMENTS

| 5,159,159 | 10/1992 | Asher | 178/18 |
| 5,659,334 | 8/1997 | Yaniger et al. | 345/156 |
| 5,828,363 | 10/1998 | Yaniger et al. | 345/156 |

*Primary Examiner*—Richard A. Hjerpe
*Assistant Examiner*—Henry N. Tran
*Attorney, Agent, or Firm*—Brooks & Kushman P.C.

[57] ABSTRACT

A computer input device that has the click function incorporated into a pointing device, rather than as a separate switch. The pointing device implements the operations of pointing, clicking and dragging based solely upon an evaluation of the pressure applied thereto. An array of sensors is monitored. The cursor direction is determined by the difference or ratio of applied force between the arrayed sensors. Cursor velocity is determined by the magnitude of the applied force. When a click is desired, the pointing device is pressed downward. The transient nature of the top or its nearly vertical force nature causes the output of the pointing device to readily distinguish between pointing and clicking operations.

8 Claims, 4 Drawing Sheets

ISOMETRIC POINTING DEVICE WITH INTEGRATED CLICK AND METHOD THEREFOR

CROSS-REFERENCE TO RELATED APPLICATION

This application is a continuation-in-part of U.S. patent application Ser. No. 08/320,008, filed Oct. 7, 1994, now abandoned.

TECHNICAL FIELD

This invention relates in general to computer input devices, and more particularly, to an isometric pointing device having the click function integrated into the movement of the pointing device itself.

BACKGROUND ART

The need for control of cursor positions on computer screens and other analogous control functions is well known. Mice, trackballs, and graphics tablets are common solutions to this need. Isometric pointing devices, which have little or no travel, have also been marketed. A popular implementation of an isometric device is the isometric joystick used by IBM (Track-point™) and other computer manufacturers, wherein a miniature isometric joystick is placed on the keyboard in or near the key cluster. For example, many manufacturers will place the joystick between the G, B, and H keys. Another isometric device is the PortaPoint®, marketed by Interlink Electronics, Inc., the applicant for the present invention.

Along with pointing, most Graphic User Interfaces (GUI's) require "clicking" and "dragging" operations, which are usually performed by depressing a switch while manipulating the pointing device. This requires a separate mechanical switch, the manipulation of which, in conjunction with the manipulation of the pointing device, is considered by many to be clumsy. On many portable computers, the thumb must be used to actuate the click buttons, which is particularly detrimental to the dragging operation.

There is a need, therefore, from both a cost and ergonomic viewpoint, for a pointing device having the click function incorporated therein.

SUMMARY OF THE INVENTION

To overcome the limitations in the prior art described above, and to overcome other limitations that will become apparent upon reading and understanding the present specification, the present invention discloses a computer input device that has the click function incorporated into a pointing device, rather than requiring activation by a separate switch.

The present invention solves the above-described problems by providing a pointing device wherein the operations of pointing, clicking and dragging are based solely upon an evaluation of the pressure applied thereto.

A system in accordance with the principles of the present invention comprises an isometric pointing device wherein force is applied normally to an array of sensors. The sensors may comprise four force sensitive resistors which can be arranged in a north, south, east west (NSEW) manner. The cursor direction is determined by the difference or ratio of applied force between the arrayed sensors. Cursor velocity is determined by the magnitude of the applied force. In addition, a means of sensing the sensor outputs is provided. Finally, a detecting means is provided for detecting when a user wishes to implement the click and/or drag functions using the arrayed sensors, rather than a separate click button.

The present invention will provide a costs savings by eliminating the need for a separate mechanical switch in pointing devices. The present invention will also reduce cost by minimizing the mounting space and simplifying assembly procedures.

One aspect of the present invention is that one-finger pointing, selecting, and dragging will be provided.

Another aspect of the present invention is that no thumb usage is necessary.

Another aspect of the present invention is that the control of the pointing device may be implemented in software or in a semiconductor device.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
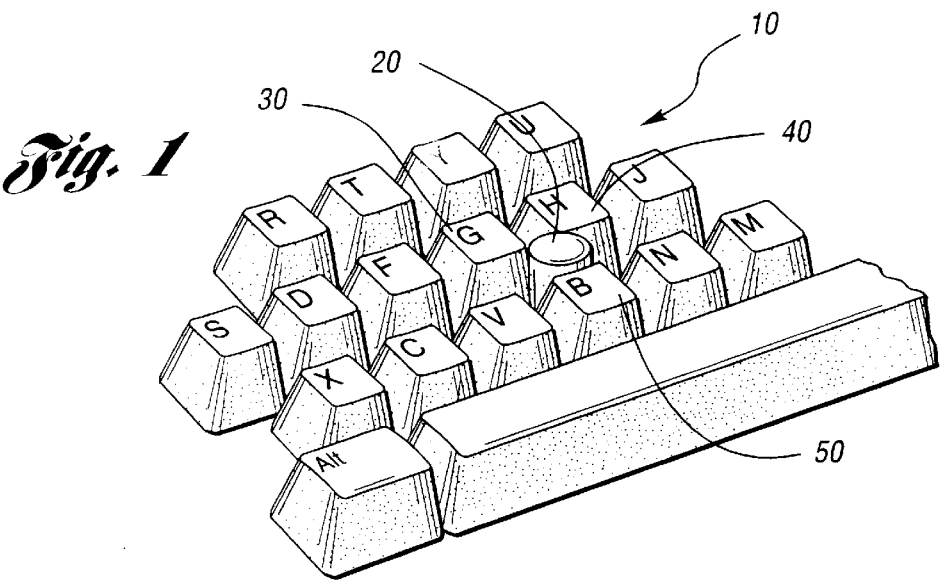
FIG. 1 is a diagram of a micro joystick positioned which may be implemented in accordance with the present invention.

The present invention provides a computer input device comprising an isometric pointing device that has the click function incorporated into the device, rather than a separate switch. FIG. 1 illustrates a pointing device 10 which may operate according to the teachings of the present invention. FIG. 1 shows a micro joystick 20 positioned between the G 30, H 40, and B 50 keys of a computer keyboard. However, it is to be understood that this embodiment is presented for illustration only and is not meant to limit the invention. Those skilled in the art will recognize that other embodiments incorporating the teaching of the present invention are possible without departing from the invention.

Figure 2:
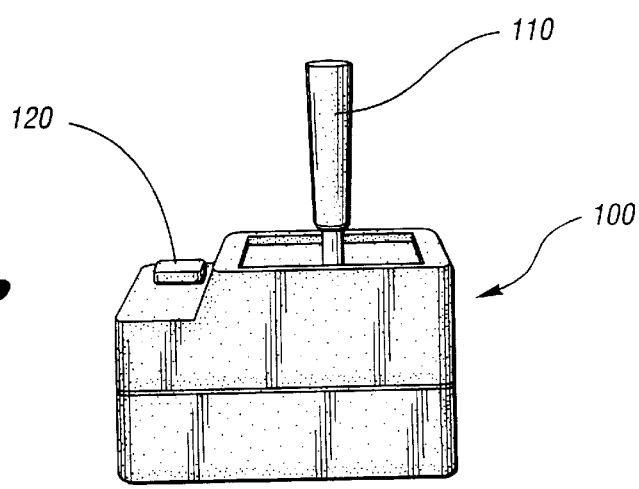
FIG. 2 is a diagram of a joystick according to the prior art.

FIG. 2 illustrates a joystick 100 which is commonly used to move a cursor on a computer screen in accordance with the prior art. The position of the stick 110 causes the cursor to move in the direction which the stick 110 is moved. Logical operations or clicking functions are implemented by pressing a switch 120.

Figure 3:
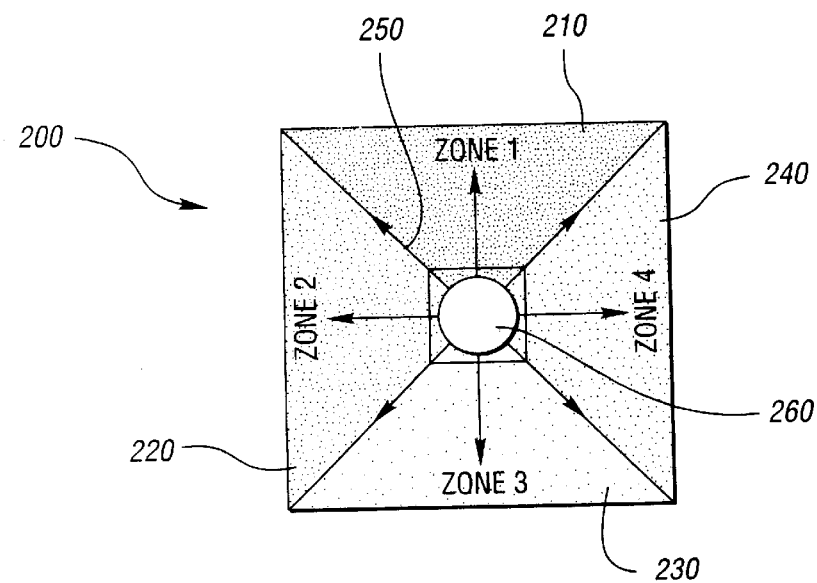
FIG. 3 is a diagram of an array of resistive sensors positioned in zones around a pointing device in accordance with the present invention.

In the present invention, force is applied normally to an array of sensors. FIG. 3 illustrates an array of resistive sensors 200 positioned in zones 210–240 around a pointing device (for example, 4 FSR sensors arrayed in the NSEW manner). Cursor direction is determined by the difference or ratio of applied force between the arrayed sensors, and cursor velocity is determined by the magnitude of the applied force. The arrows 250 represent movement by the joystick 260.

Figure 4:
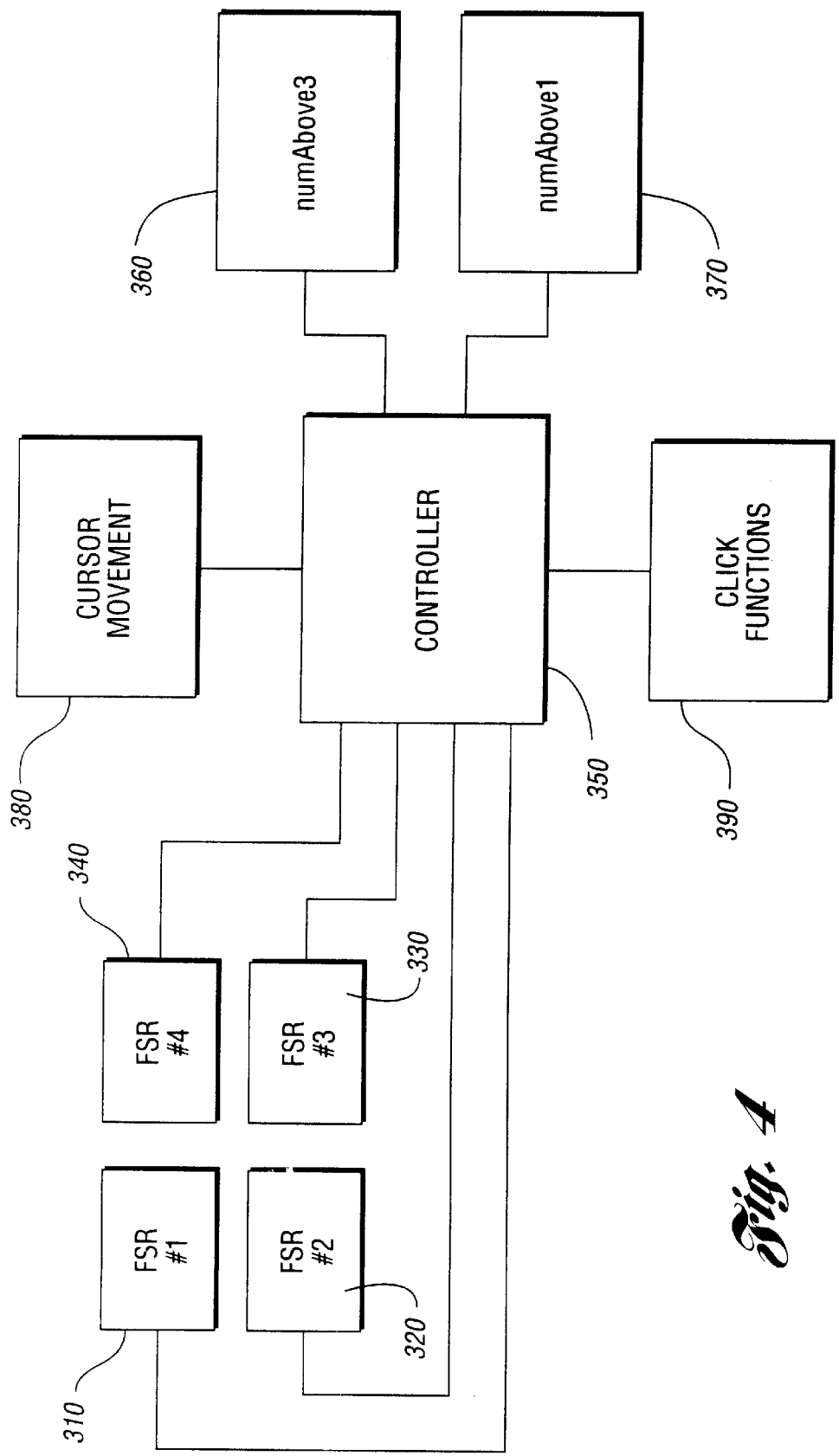
FIG. 4 is a block diagram of the present invention.

FIG. 4 illustrates a block diagram of the present invention. The magnitude of the force applied to a pointing device is derived from the outputs of four sensors 310–340 which represent the four zones. FIG. 4 illustrates the four sectors as being FSR's in the preferred embodiment. However, those skilled in the art will recognize that other force sensors could be substituted for the FSR's. The controller 350 takes the measurements from the sensor and determines whether the output signal from each sensor is indicative of an applied force exceeding a first threshold. The controller then stores a value representing the number of zones which exceed a "3zone" threshold in the "numAbove3" register 360. The controller 350 also stores a value representing the number of zones which exceed a "1zone" threshold in the "numabove1" register 370. The controller 350 then determines from the stored values whether the pointing device is in the pointing mode wherein the cursor is controlled by the cursor movement 380 or the click mode in which click functions 390 are implemented.

Figure 5:
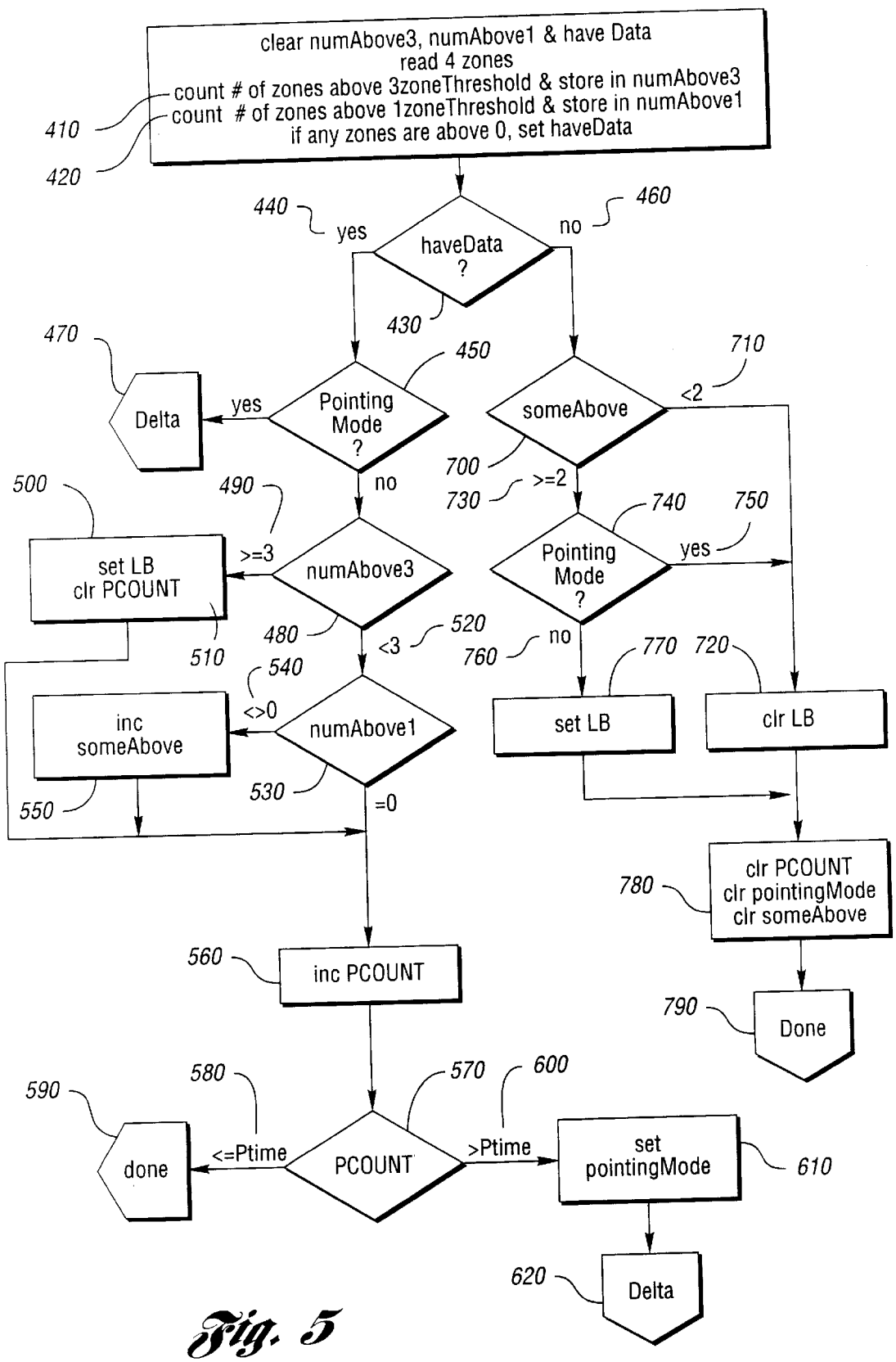
FIG. 5 is a flow chart demonstrating the operation of the present invention.

FIG. 5 illustrates a flow chart illustrating the operation of the preferred implementation. This particular implementation can be programmed into a microcontroller which then sends pointing and clicking data to the computer. This routine could also be incorporated into the software driver in a computer. This has the advantage of allowing the user to easily vary the thresholds and time delays.

The determination of whether the pointing device is being used for click operations begins by first clearing the numAbove3 and numabove1 registers 400. Then the number of FSR's which have outputs indicative of an applied force exceeding the 3zone threshold are stored in the numAbove3 register 410. The number of FSR's which have outputs indicative of an applied force exceeding the 1zone threshold are stored in the numAbove1 register 420. Next, the controller determines whether pressure is being applied to the pointing device 430. If pressure is being applied to the pointing device 440, the controller verifies whether a pointing mode flag has been set 450. If pressure is not being applied to the pointing device 460, the controller proceeds to perform the steps 700–790. If the pointing mode flag has been set 450 and pressure is being applied to the pointing device 440, the velocity and direction of the cursor is adjusted 470. Otherwise, the controller determines whether three or more zones exceed the 3zone threshold 480. If three or more zones exceed the 3zone threshold 490, the controller activates the click operation 500 (set LB, i.e. Left Button or Primary). In addition, a pointing counter (PCOUNT) is cleared 510. The effect of the pointing counter will be explained below.

If less than three zones exceed the 3zone threshold 520, the controller then determines whether any zones exceed the 1zone threshold 530. In the preferred embodiment, the 1zone threshold is chosen to be greater than the 3zone threshold. If a zone exceeds the 1zone threshold 540, the someAbove counter is incremented 550. Thereafter, the pointing counter is incremented.

The value of the pointing counter is compared against a predetermined timeout period 570. Each count of the pointing counter represents 5 milliseconds in the preferred embodiment. The timeout period (Ptime) in the preferred embodiment is chosen to be 200 milliseconds. Thus, the pointing counter may be incremented forty times before timing out. If the value of the pointing counter is less than or equal to the timeout period 580, the routine is exited 590. If the value of the pointing counter is greater than the timeout period 600, the pointing mode flag is set 610 and the controller adjusts the velocity and direction of the cursor 620.

In the situation where no pressure is being applied to the pointing device 460, the controller determines whether a zone has exceeded the 1zone threshold for 10 milliseconds or more 700. Recall that each cycle through the routine accounts for 5 milliseconds. Thus, the someAbove counter must be incremented at least twice. If the someAbove counter has not been incremented twice 710, the click operation (clr LB) is cleared 720. Thus, transients or bounce conditions of less than 10 milliseconds are filtered out.

If sufficient force has been applied to the pointing device in a single zone for 10 milliseconds or more 730, the controller determines whether the pointing mode flag has been set 740. If the pointing mode has been set 750, the cursor is being moved and the controller does not allow initiation of click operations. In this situation, the click operation is again cleared 720. However, if the pointing mode flag has not been set 760, a click operation is initiated 770. Thereafter, the pointing counter, pointing mode flag, and someAbove counter are cleared 780. The routine is then exited 790.

In summary, the isometric pointing device is implemented in the following manner. When a click is desired, the user taps the top of the pointing device, or sharply increases the amount of downward force on the device. As the output of the force sensor array is monitored, a set of rules is used to determine when this has occurred. The transient nature of the tap or its nearly vertical force nature causes the output of the pointing device to readily distinguish between pointing and clicking operations.

When the normal force sensors sense that the force is nearly straight downward, and is thus not pointing information, and simultaneously the normal force reaches or exceeds a predetermined threshold, the detection means senses that the user has clicked, and suppresses any cursor movement due to the user not striking the pointing device exactly vertically. The drag function is implemented by allowing the click to remain "on" until all vertical force on the pointing device returns to zero (i.e., the user removes his or her finger), at which time, the cursor "unclicks."

Another rule that can be used is the duration of a force increase. For example, tapping the top of the pointing device causes the sensors to register a force transient of a much shorter duration than is seen with a pointing operation. Hence, a force increase and decrease within a present time window is detected as a tap, and the click function is enabled. In the example discussed above with reference to FIG. 5, the force must exist for at least 10 milliseconds but cannot exceed 200 milliseconds.

Another important aspect of this invention is that pointing is disabled during the click and for a short time thereafter.

Without such a disabling, the cursor tends to jump due to the tap. To implement this, a time delay is used when the pointing device is initially touched. This delay is short enough not to be detectable to the user, but long enough to inhibit cursor motion during a click.

Figure 6:
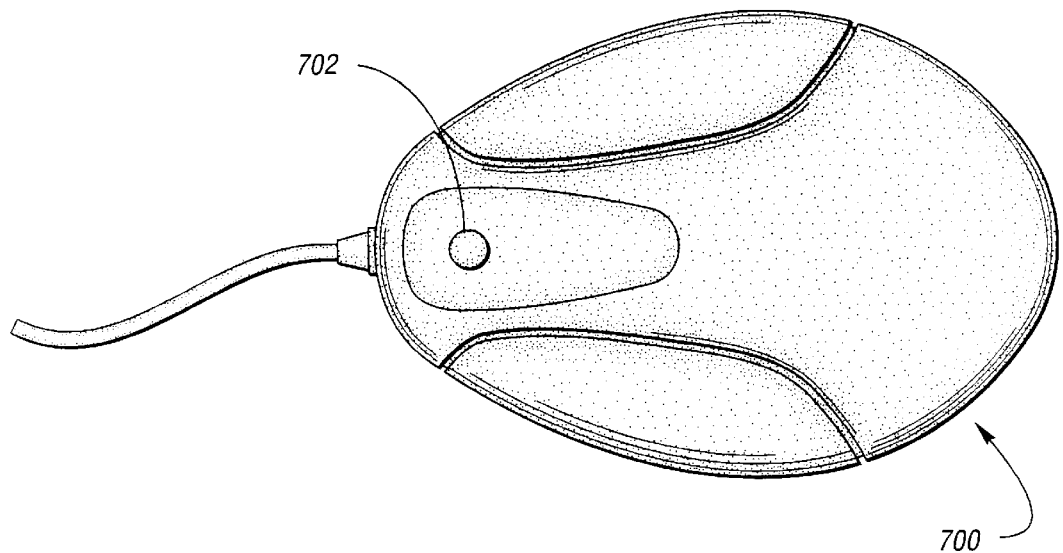
FIG. 6 is a plan view of a mouse incorporating a micro joystick and sensor array in accordance with the present invention.
Figure 7:
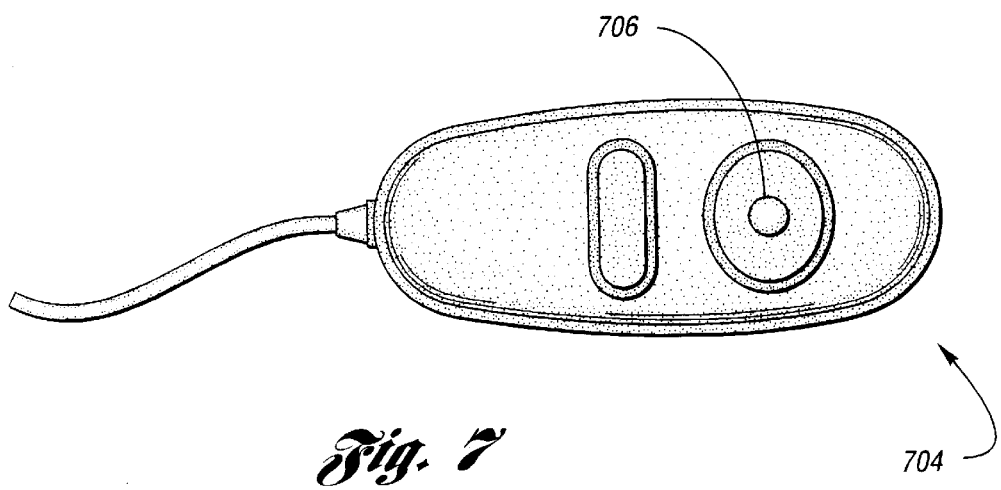
FIG. 7 is a plan view of a remote device incorporating a micro joystick and sensor array in accordance with the present invention.

Referring to FIG. 6, a mouse 700 is shown incorporating a computer input device 702 in accordance with the present invention. The computer input device 702 may be used for cursor movement, clicking, panning, scrolling, zooming, etc. FIG. 7 shows a remote device 704 incorporating a computer input device 706 in accordance with the present invention. Again, the computer input device 706 may be used for any of a variety of on-screen functions. Of course, these computer input devices 702, 706 could be button-types or joystick-types.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer input device for moving a cursor on a computer display and implementing clicking functions on areas highlighted by the cursor in response to force applied to the device, comprising:
    an array of sensors, the sensors each having an output terminal for producing a signal;
    a controller coupled to the array of sensors for deriving from the signals the amount of force applied to each sensor;
    wherein said controller is operative to determine whether at least three of the sensors are experiencing an applied force exceeding a first threshold, and to implement a click function in response to at least three of the sensors experiencing an applied force exceeding the first threshold; and
    wherein said controller is further operative to determine whether at least one of the sensors is experiencing an applied force exceeding a second threshold during a predetermined window of time, and operative to implement a click function in response to one of the sensors exceeding the second threshold during the window of time.

2. The computer input device of claim 1, wherein said controller is further operative to ascertain whether force applied to the sensors translates to pointing functions, and further to disable movement of the cursor during implementation of a click function until a timeout period has passed.

3. An isometric pointing device, comprising:
    means for applying a force to at least one sensor in an array of sensors;
    means, coupled to the sensor array, for deriving the magnitude of the force applied to each sensor;
    direction means, coupled to the measuring means, for determining cursor direction by a ratio of the applied force between the arrayed sensors;
    velocity means, coupled to the measuring means, for determining cursor velocity by the magnitude of the applied force;
    means, coupled to the measuring means, for detecting when click and drag functions are implemented according to the value of force applied to each sensor and to the number of sensors having force applied thereto, wherein the detecting means further comprises:
        first implementing means for determining whether at least three of the sensors are experiencing an applied force exceeding a first threshold, the click and drag functions being implemented in response to at least three of the sensors experiencing an applied force exceeding the first threshold; and
        second implementing means for determining whether at least one of the sensors is experiencing an applied force exceeding a second threshold during a predetermined window of time, the click and drag functions being implemented in response to one of the sensors experiencing an applied force exceeding the second threshold during the window of time.

4. A computer input device for performing on-screen operations in response to force applied to the device, comprising:
    an array of force sensors;
    a force applicator coupled to the force sensors, for applying forces to the force sensors;
    means, coupled to the sensors, for ascertaining whether force applied to the sensors translates to point and clicking functions;
    movement means, coupled to the ascertaining means for moving the cursor in response to the applied force translating to pointing functions; and
    selecting means, coupled to the ascertaining means, for selecting the highlighted area in response to the applied force translating to clicking functions, wherein the ascertaining means further comprises:
        first implementing means for determining whether at least three of the sensors are experiencing an applied force exceeding a first threshold, a click function being implementing in response to at least three of the sensors experiencing an applied force exceeding the first threshold; and
        second implementing means for determining whether at least one of the sensors is experiencing an applied force exceeding a second threshold during a predetermined window of time, a click function being implemented in response to one of the sensors experiencing an applied force exceeding the second threshold during the window of time.

5. A method of performing click functions for a computer input device comprising the steps of:
    clearing a first register for storing a first value representing the number of sensors in an array generating output signals indicative of an applied force which exceeds a first threshold;
    clearing a second register for storing a second value representing the number of sensors in an array generating output signals indicative of an applied force which exceeds a second threshold;
    determining the first value and storing the value in the first register;
    determining the second value and storing the value in the second register;
    determining whether the first value is greater than or equal to three;
    implementing a click function in response to the first value being greater than or equal to three;
    determining whether the second value is maintained during a predetermined window of time; and
    implementing a click function in response to the second value being maintained during the predetermined window of time.

6. The method of performing click functions for a computer input device of claim 5 further comprising the steps of:
   ascertaining whether cursor movement should be implemented; and
   delaying movement of the cursor during implementation of the click function and until a timeout period elapsed.

7. A method of performing click functions for an isometric pointing device comprising the steps of:
   measuring the output signal of each sensor in an array of sensors;
   determining whether at least three of the sensor output signals is indicative of an applied force exceeding a first threshold;
   implementing a click function in response to at least three of the sensor signals being indicative of an applied force exceeding the first threshold;
   determining whether at least one of the sensor output signals is indicative of an applied force exceeding a second threshold during a predetermined window of time; and
   implementing a click function in response to one of the sensors exceeding the second threshold during the window of time.

8. The method of performing click functions for an isometric pointing device of claim 7 further comprising the steps of:
   ascertaining whether force applied to the sensors translates to pointing functions; and
   disabling the movement of the cursor during implementation of a click function and until a timeout period has passed.

* * * * *